(12) United States Patent
Sterns et al.

(10) Patent No.: US 10,802,740 B2
(45) Date of Patent: Oct. 13, 2020

(54) SYSTEMS, METHODS, AND COMPUTER READABLE MEDIA PROVIDING ARBITRARY SIZING OF DATA EXTENTS

(71) Applicant: NetApp, Inc., Sunnyvale, CA (US)

(72) Inventors: Randolph Sterns, Boulder, CO (US); Charles Binford, Wichita, KS (US); William P. Delaney, Wichita, KS (US); Joseph Blount, Wichita, KS (US); Reid Kaufmann, Wichita, KS (US); Joseph Moore, Wichita, KS (US)

(73) Assignee: NETAPP, INC., Sunnyvale, CA (US)

( * ) Notice: Subject to any disclaimer, the term of this patent is extended or adjusted under 35 U.S.C. 154(b) by 342 days.

(21) Appl. No.: 15/135,161

(22) Filed: Apr. 21, 2016

(65) Prior Publication Data

US 2017/0308303 A1 Oct. 26, 2017

(51) Int. Cl.
*G06F 3/06* (2006.01)
*G06F 11/10* (2006.01)

(52) U.S. Cl.
CPC ............ *G06F 3/064* (2013.01); *G06F 3/067* (2013.01); *G06F 3/0607* (2013.01); *G06F 3/0689* (2013.01); *G06F 11/1004* (2013.01)

(58) Field of Classification Search
CPC ...... G06F 3/064; G06F 3/0604; G06F 3/0631; G06F 3/0673; G06F 11/1004; G06F 3/0626
See application file for complete search history.

(56) References Cited

U.S. PATENT DOCUMENTS

| | | | | |
|---|---|---|---|---|
| 4,827,462 A | * | 5/1989 | Flannagan | G06F 3/0601 369/30.09 |
| 6,654,772 B1 | * | 11/2003 | Crow | G06F 17/30067 |
| 7,631,159 B1 | * | 12/2009 | Krishnamurthy | G06F 11/1435 711/162 |
| 8,805,886 B1 | * | 8/2014 | Kiselev | G06F 16/2379 707/793 |
| 8,806,115 B1 | | 8/2014 | Patel et al. | |
| 9,047,189 B1 | * | 6/2015 | Gupta | G06F 11/10 |
| 9,164,694 B1 | * | 10/2015 | Ybarra | G06F 12/1408 |
| 9,170,746 B2 | | 10/2015 | Sundaram et al. | |
| 9,268,502 B2 | | 2/2016 | Zheng et al. | |

(Continued)

OTHER PUBLICATIONS

Viswanath K., "NetApp Data Compression, Deduplication and Data Compaction," Data ONTAP 8.3.1 and Later, NetApp Technical Report, Feb. 2018, pp. 1-75.

(Continued)

*Primary Examiner* — Mano Padmanabhan
*Assistant Examiner* — Andrew J Cheong
(74) *Attorney, Agent, or Firm* — Haynes and Boone, LLP

(57) ABSTRACT

A method includes: storing a first data extent on a physical medium, wherein the physical medium is divided into a plurality of storage blocks, wherein each of the storage blocks has a size that is different than a size of the first data extent, further wherein the first data extent is stored to a first block of the plurality of storage blocks; generating a descriptor for the first data extent, wherein the descriptor indicates that the first data extent starts within the first block of the plurality of blocks and indicates an offset from the beginning of the first block at which the first data extent starts; and storing the descriptor within the first block.

20 Claims, 9 Drawing Sheets

(56) References Cited

U.S. PATENT DOCUMENTS

| | | | |
|---|---|---|---|
| 9,274,720 B1* | 3/2016 | Ori | G06F 3/0653 |
| 9,405,783 B2 | 8/2016 | Kimmel et al. | |
| 9,448,924 B2 | 9/2016 | Sundaram et al. | |
| 9,524,103 B2 | 12/2016 | Babu et al. | |
| 9,529,546 B2 | 12/2016 | Sundaram et al. | |
| 9,652,408 B2* | 5/2017 | Cherian | G06F 12/1408 |
| 2002/0162076 A1* | 10/2002 | Talagala | G06F 11/1076 |
| | | | 714/819 |
| 2004/0105332 A1* | 6/2004 | Crow | G06F 17/30067 |
| | | | 365/202 |
| 2006/0004950 A1* | 1/2006 | Wang | G06F 11/1435 |
| | | | 711/103 |
| 2008/0228770 A1* | 9/2008 | Halcrow | G06F 17/30079 |
| 2009/0259924 A1* | 10/2009 | Amann | G06F 3/061 |
| | | | 714/807 |
| 2010/0121825 A1* | 5/2010 | Bates | G06F 17/30156 |
| | | | 707/692 |
| 2010/0131773 A1* | 5/2010 | Cherian | G06F 21/64 |
| | | | 713/193 |
| 2011/0145523 A1* | 6/2011 | Gupta | G06F 3/0608 |
| | | | 711/159 |
| 2012/0079175 A1* | 3/2012 | Flynn | G11C 7/1012 |
| | | | 711/103 |
| 2012/0150893 A1* | 6/2012 | Inoue | G06F 16/58 |
| | | | 707/758 |
| 2012/0166909 A1* | 6/2012 | Schmisseur | G06F 11/1076 |
| | | | 714/758 |
| 2012/0297272 A1* | 11/2012 | Bakke | G06F 11/1076 |
| | | | 714/770 |
| 2012/0323934 A1* | 12/2012 | Amir | G06F 17/30091 |
| | | | 707/752 |
| 2013/0054918 A1* | 2/2013 | Banzhaf | G06F 11/1076 |
| | | | 711/163 |
| 2013/0226887 A1* | 8/2013 | Braam | H04L 67/1097 |
| | | | 707/697 |
| 2014/0052691 A1* | 2/2014 | Sasson | G06F 17/30575 |
| | | | 707/625 |
| 2014/0068208 A1* | 3/2014 | Feldman | G06F 11/1076 |
| | | | 711/162 |
| 2014/0325143 A1* | 10/2014 | Kelton | G06F 3/0659 |
| | | | 711/114 |
| 2015/0106579 A1* | 4/2015 | Barrus | G06F 3/0655 |
| | | | 711/159 |
| 2015/0281197 A1* | 10/2015 | Smart | H04L 63/08 |
| | | | 726/6 |
| 2016/0070714 A1 | 3/2016 | D'Sa et al. | |
| 2016/0077746 A1 | 3/2016 | Muth et al. | |
| 2016/0092467 A1* | 3/2016 | Lee | G06F 17/30203 |
| | | | 707/827 |
| 2016/0147468 A1* | 5/2016 | Desai | G06F 12/0246 |
| | | | 711/162 |
| 2016/0147651 A1* | 5/2016 | Desai | G06F 12/0246 |
| | | | 711/103 |
| 2016/0239207 A1* | 8/2016 | Takakura | G06F 3/0604 |
| 2017/0075781 A1* | 3/2017 | Bennett, Jr. | G06F 3/0619 |
| 2017/0187389 A1* | 6/2017 | Radhakrishnan | H03M 13/091 |

OTHER PUBLICATIONS

Viswanath K., "NetApp Data Compression, Deduplication and Data Compaction," Data ONTAP 8.3.1 and Later, NetApp Technical Report, Jul. 2016, pp. 1-63.

* cited by examiner

SYSTEMS, METHODS, AND COMPUTER READABLE MEDIA PROVIDING ARBITRARY SIZING OF DATA EXTENTS

TECHNICAL FIELD

The present description relates to data storage systems, and more specifically, to techniques providing arbitrarily sized data extents.

BACKGROUND

In some storage systems data that is input from one or more hosts may be persisted to one or more storage devices logically grouped as one or more volumes before metadata regarding the input is updated. For example, in some storage systems indirection may be used to map (e.g., the metadata regarding the input) between the addresses provided by one or more hosts to identify volumes and the logical and physical locations of the storage devices maintained by the storage system. This enables the hosts to generically interface with the storage system without having to know the particular configuration of the specific storage system.

Of course, indirection is an abstraction on top of the physical storage devices that store the data. For instance, hard disk drives (HDDs) are usually divided into physical storage blocks of either 4 kB or 512 B. Some conventional systems assume that data is written as extents that are aligned with the physical blocks of the storage drive. This can be very efficient, and some storage drives even include blocks that have extra space included for T10 protection information, thereby allowing T10 protection information to be included within the extents as they are written without causing extents to become unaligned with their respective blocks. However, many of the most cost efficient storage drives do not include extra space for T10 protection information. Furthermore, using compression may change the size of data, thereby affecting alignment of data with physical storage blocks.

Current systems are constrained by the alignment of data extents and the physical blocks of the storage drives. It would be desirable for some data systems to be able to write arbitrarily sized data extents and to be able to include any kind of helpful information within data extents regardless of the size of physical storage blocks of the storage drive.

BRIEF DESCRIPTION OF THE DRAWINGS

The present disclosure is best understood from the following detailed description when read with the accompanying figures.

DETAILED DESCRIPTION

Figure 1:
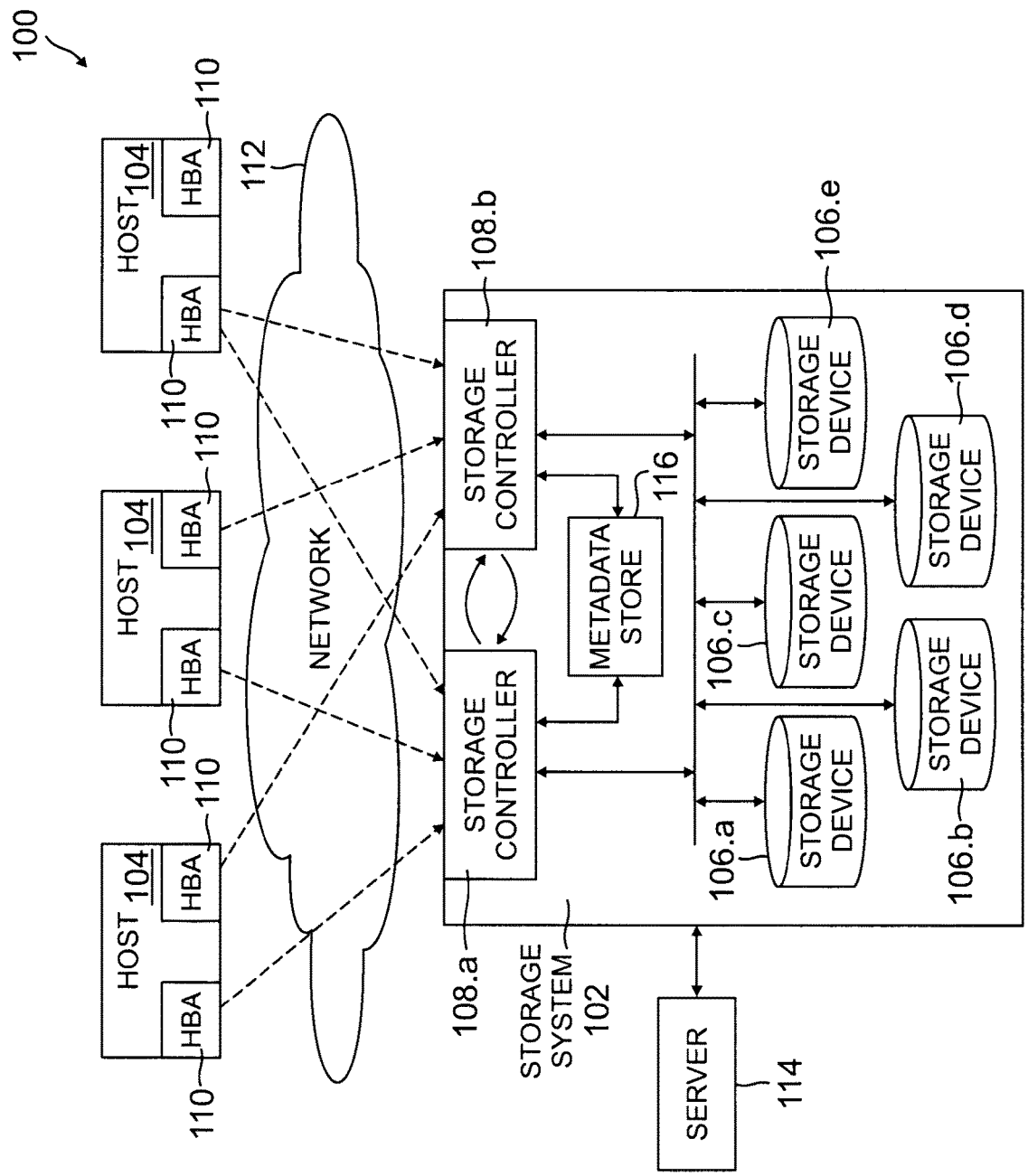
FIG. 1 is an organizational diagram of an exemplary data storage architecture according to aspects of the present disclosure.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments. Finally, in view of this disclosure, particular features described in relation to one aspect or embodiment may be applied to other disclosed aspects or embodiments of the disclosure, even though not specifically shown in the drawings or described in the text.

Various embodiments include systems, methods, and machine-readable media for writing arbitrarily sized data extents to storage drives that are divided into physical storage blocks. Although in some embodiments a data extent might align with a physical block, it is generally expected that the arbitrarily sized data extents would not align with physical blocks, with some data extents being smaller than the size of a physical block, some data extents being larger than the size of a physical block, some physical blocks including multiple data extents, and some data extents overlapping from one physical block to another.

To accomplish the goal of writing arbitrarily sized data extents, various embodiments include in-line descriptors, such as headers or footers, into physical blocks to describe the data extents in those physical blocks. For instance, a given physical block may include an in-line descriptor for a data extent in that block, and the descriptor indicates that the data extent starts within that block and also indicates an offset from the beginning of the block at which the data extent starts. The in-line descriptor can be used to indicate that multiple data extents begin within the same physical block, thereby allowing multiple data extents to share the same physical block. The in-line descriptor is included within the block so that when the block is read both the data and the descriptor are read, thereby eliminating performance penalty for reading the descriptor information.

Larger portions of data, such as stripes or segments may also include in-line descriptors to describe the data in that stripe or segment. Furthermore, metadata that maps data volume addresses to physical areas within a storage drive may be stored in a similar manner. For instance, such metadata may be stored in arbitrarily sized data extents at either the same storage drive or a different storage drive that stores the data itself. In one example, the user data is stored at a group of HDDs that are configured as a RAID, and the metadata is stored in one or more solid state drives (SSDs) associated with the storage system. Even though SSDs and HDDs are configured physically differently, the storage system stores the metadata in the SSDs using arbitrarily sized extents and in-line descriptors.

Of course, the various embodiments are not limited to any particular kind of storage media, as embodiments may be implemented in HDDs, SSDs, or any other appropriate storage device.

Since the system stores arbitrarily sized data extents, the system may be configured to include any appropriate or helpful information within the physical blocks of the storage drives. For instance, it was mentioned above that the descriptors may include an identification that a data extent starts within a block and also provides an offset. Other information may be included additionally or alternatively. For instance, some descriptors may provide for an indication of a type of data extent, protection information, compression information, an indication of the data extent within a larger data grouping such as an identification of a segment or stripe, and/or the like.

Various embodiments may provide one or more advantages over conventional systems. For instance, the various embodiments may allow for the use of more cost efficient storage drives that do not provide extra room within the physical block for protection information, since the size of data extents is not limited to the physical size of the blocks. By contrast, conventional systems using those more cost efficient storage drives might store protection information in a different way or not at all. Furthermore, the in-line descriptors may include helpful information, such as an identification of the data extent within a larger data grouping, thereby allowing a troubleshooting algorithm to determine whether a write mistake has been made by the storage device. These and other advantages are described in more detail below.

FIG. 1 illustrates a data storage architecture 100 in which various embodiments may be implemented. Specifically, and as explained in more detail below, one or both of the storage controllers 108.a and 108.b read and execute computer readable code to perform the methods described further herein to read and write arbitrarily sized data extents.

The storage architecture 100 includes a storage system 102 in communication with a number of hosts 104. The storage system 102 is a system that processes data transactions on behalf of other computing systems including one or more hosts, exemplified by the hosts 104. The storage system 102 may receive data transactions (e.g., requests to write and/or read data) from one or more of the hosts 104, and take an action such as reading, writing, or otherwise accessing the requested data. For many exemplary transactions, the storage system 102 returns a response such as requested data and/or a status indictor to the requesting host 104. It is understood that for clarity and ease of explanation, only a single storage system 102 is illustrated, although any number of hosts 104 may be in communication with any number of storage systems 102.

While the storage system 102 and each of the hosts 104 are referred to as singular entities, a storage system 102 or host 104 may include any number of computing devices and may range from a single computing system to a system cluster of any size. Accordingly, each storage system 102 and host 104 includes at least one computing system, which in turn includes a processor such as a microcontroller or a central processing unit (CPU) operable to perform various computing instructions. The instructions may, when executed by the processor, cause the processor to perform various operations described herein with the storage controllers 108.a, 108.b in the storage system 102 in connection with embodiments of the present disclosure. Instructions may also be referred to as code. The terms "instructions" and "code" may include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The processor may be, for example, a microprocessor, a microprocessor core, a microcontroller, an application-specific integrated circuit (ASIC), etc. The computing system may also include a memory device such as random access memory (RAM); a non-transitory computer-readable storage medium such as a magnetic hard disk drive (HDD), a solid-state drive (SSD), or an optical memory (e.g., CD-ROM, DVD, BD); a video controller such as a graphics processing unit (GPU); a network interface such as an Ethernet interface, a wireless interface (e.g., IEEE 802.11 or other suitable standard), or any other suitable wired or wireless communication interface; and/or a user I/O interface coupled to one or more user I/O devices such as a keyboard, mouse, pointing device, or touchscreen.

The exemplary storage system 102 contains any number of storage devices 106 and responds to one or more hosts 104's data transactions so that the storage devices 106 may appear to be directly connected (local) to the hosts 104. In various examples, the storage devices 106 include hard disk drives (HDDs), solid state drives (SSDs), optical drives, and/or any other suitable volatile or non-volatile data storage medium. In some embodiments, the storage devices 106 are relatively homogeneous (e.g., having the same manufacturer, model, and/or configuration). However, the storage system 102 may alternatively include a heterogeneous set of storage devices 106 that includes storage devices of different media types from different manufacturers with notably different performance.

The storage system 102 may group the storage devices 106 for speed and/or redundancy using a virtualization technique such as RAID or disk pooling (that may utilize a RAID level). The storage system 102 also includes one or more storage controllers 108.a, 108.b in communication with the storage devices 106 and any respective caches. The storage controllers 108.a, 108.b exercise low-level control over the storage devices 106 in order to execute (perform) data transactions on behalf of one or more of the hosts 104. The storage controllers 108.a, 108.b are illustrative only; more or fewer may be used in various embodiments. Having at least two storage controllers 108.a, 108.b may be useful, for example, for failover purposes in the event of equipment failure of either one. The storage system 102 may also be communicatively coupled to a user display for displaying diagnostic information, application output, and/or other suitable data.

In an embodiment, the storage system 102 may group the storage devices 106 using a dynamic disk pool (DDP) (or other declustered parity) virtualization technique. In a DDP, volume data, protection information, and spare capacity are distributed across the storage devices included in the pool. As a result, each of the storage devices in the DDP remain active, and spare capacity on any given storage device is available to each of the volumes existing in the DDP.

An assigned data extent becomes a "data piece," and each data stripe has a plurality of data pieces, for example sufficient for a desired amount of storage capacity for the volume and a desired amount of redundancy, e.g. RAID 0, RAID 1, RAID 10, RAID 5 or RAID 6 (to name some examples). As a result, each data stripe appears as a mini RAID volume, and each logical volume in the disk pool is typically composed of multiple data stripes. Further, according to embodiments of the present disclosure, one or more data stripes may compose a given segment as used herein (i.e., a segment may include some integer number of data stripes).

Figure 2:
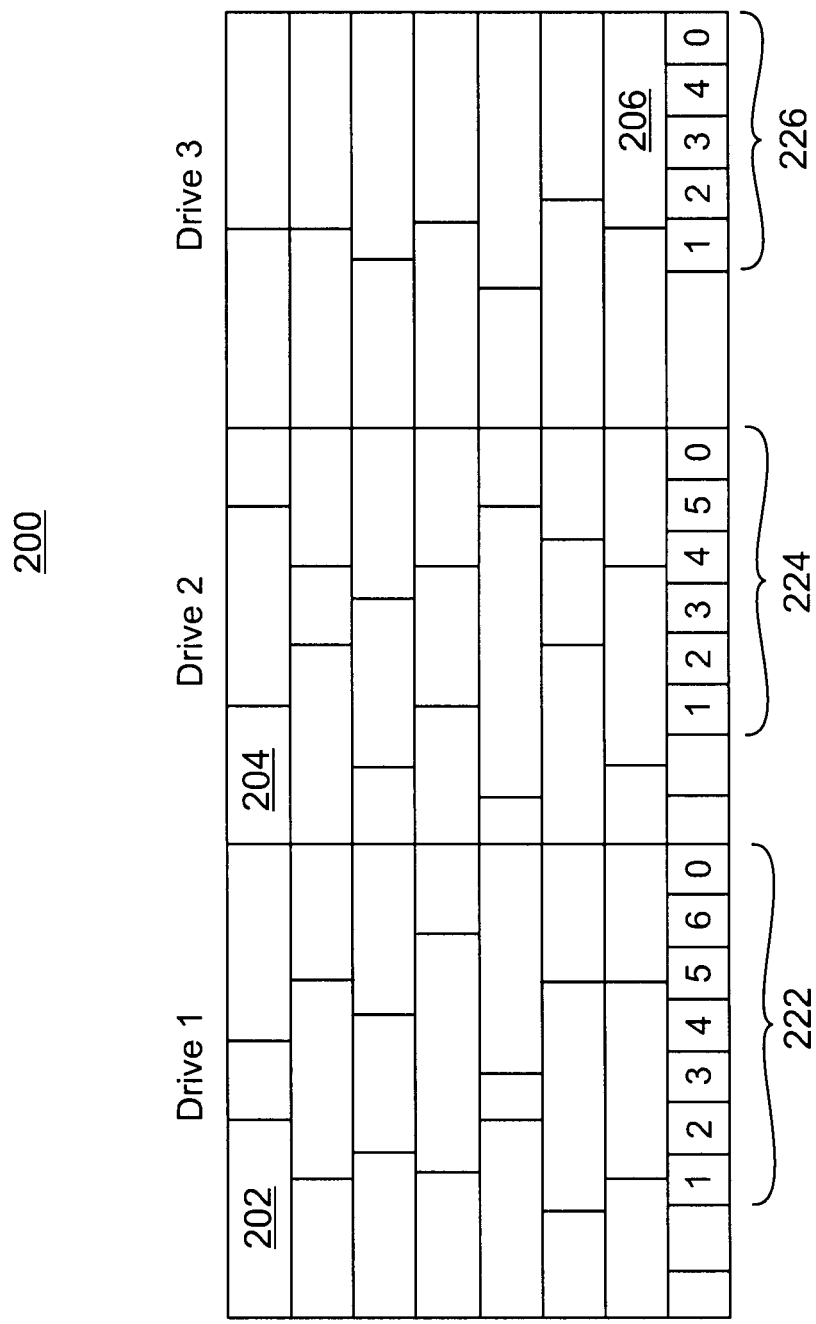
FIG. 2 is an illustration of a data stripe across multiple storage drives according to aspects of the present disclosure.

FIG. 2 is an illustration of an example stripe 200 according to one embodiment. The stripe 200 includes three pieces—a first piece on Drive 1, a second piece on Drive 2, and a third piece on Drive 3. The stripe 200 is shown as utilizing three drives for ease of illustration, and it is understood that various embodiments may use any appropriate number of storage drives as well as parity drives (not shown). Examples of storage drives include the storage devices 106 of FIG. 1. Looking at the stripe piece on Drive 1, data extent 202 is illustrated at the top left corner thereof, and it is one of many data extents illustrated in the portion on Drive 1. Data extent 204 is written to Drive 2, and data extent 206 is written that Drive 3. Data extent 202 is the first data extent written in the stripe, and data extent 206 is the last extent written to the stripe. As will be explained in more detail below, each stripe piece includes a respective table of contents 222, 224, or 226. Although not illustrated in FIG. 2, it is understood that each of the drives is divided into a plurality of consistently sized physical blocks, such as 4 kB or 512 bytes. The various data extents, such as extents 202-206, are arbitrarily sized, and in fact are different sizes. In this example, the data extents are not aligned with, nor are they a same size as, the physical blocks of the storage drives.

Returning to the example of FIG. 1, the storage system 102 may also include a metadata store 116. The metadata store 116 may be composed of one or more storage devices, such as one or more solid-state devices. In an embodiment, the metadata store 116 may also be grouped using DDP as a virtualization technique. The metadata store 116 may serve to store metadata regarding data (e.g., written from one or more hosts 104) in the storage devices 106. Examples of metadata include data mapping a logical block address (LBA) of data within a volume to a physical address within a storage drive, and the like. In other words, such metadata may facilitate translating the specified LBAs of the data to physical block addresses used by the storage devices 106. In an embodiment, write data may be received from one or more hosts 104 and momentarily stored in a write-back cache of the storage system 102, e.g. using LBAs before being stored to devices 106. In some examples, devices 106 may be implemented as hard disk drives (HDDs), whereas metadata store 116 may be implemented using one or more solid-state drives (SSDs); however various embodiments may use any appropriate physical storage media.

For example, the metadata store 116 may include a tree data structure metadata store to house a tree data structure that facilitates translation of a specified volume/LBA to an extent identifier. An extent in this example, and as a concept includes the basic unit that maps to the contents of a given write I/O from a host (thus, may be arbitrarily sized from a minimum specified size to a maximum specified size). The metadata store 116 may also include other information such as a reference count that may track how many times the particular data is referenced in the tree data structure (for example). The different information destined for the metadata store 116 (e.g., tree data structure) may be addressed into the metadata store 116 with metadata block addresses associated with metadata objects.

Returning to the present example of FIG. 1, storage controllers 108.a and 108.b are arranged as an HA pair.

Moreover, the storage system 102 may be communicatively coupled to a server 114. The server 114 includes at least one computing system, which in turn includes a processor, for example as discussed above. The computing system may also include a memory device such as one or more of those discussed above, a video controller, a network interface, and/or a user I/O interface coupled to one or more user I/O devices. The server 114 may include a general purpose computer or a special purpose computer and may be embodied, for instance, as a commodity server running a storage operating system. While the server 114 is referred to as a singular entity, the server 114 may include any number of computing devices and may range from a single computing system to a system cluster of any size. In an embodiment, the server 114 may also provide data transactions to the storage system 102, and in that sense may be referred to as a host 104 as well. The server 114 may have a management role and be used to configure various aspects of the storage system 102 as desired, for example under the direction and input of a user. Some configuration aspects may include definition of RAID group(s), disk pool(s), and volume(s), to name just a few examples. These configuration actions described with respect to server 114 may, alternatively, be carried out by any one or more of the other devices identified as hosts 104 in FIG. 1 without departing from the scope of the present disclosure.

With respect to the hosts 104, a host 104 includes any computing resource that is operable to exchange data with storage system 102 by providing (initiating) data transactions to the storage system 102. In an exemplary embodiment, a host 104 includes a host bus adapter (HBA) 110 in communication with a storage controller 108.a, 108.b of the storage system 102. The HBA 110 provides an interface for communicating with the storage controller 108.a, 108.b, and in that regard, may conform to any suitable hardware and/or software protocol. In various embodiments, the HBAs 110 include Serial Attached SCSI (SAS), iSCSI, InfiniBand, Fibre Channel, and/or Fibre Channel over Ethernet (FCoE) bus adapters. Other suitable protocols include SATA, eSATA, PATA, USB, and FireWire.

The HBAs 110 of the hosts 104 may be coupled to the storage system 102 by a network 112, for example a direct connection (e.g., a single wire or other point-to-point connection), a networked connection, or any combination thereof. Examples of suitable network architectures 112 include a Local Area Network (LAN), an Ethernet subnet, a PCI or PCIe subnet, a switched PCIe subnet, a Wide Area Network (WAN), a Metropolitan Area Network (MAN), the Internet, Fibre Channel, or the like. In many embodiments, a host 104 may have multiple communicative links with a single storage system 102 for redundancy. The multiple links may be provided by a single HBA 110 or multiple HBAs 110 within the hosts 104. In some embodiments, the multiple links operate in parallel to increase bandwidth.

To interact with (e.g., write, read, modify, etc.) remote data, a host HBA 110 sends one or more data transactions to the storage system 102. Data transactions are requests to write, read, or otherwise access data stored within a data storage device such as the storage system 102, and may contain fields that encode a command, data (e.g., information read or written by an application), metadata (e.g., information used by a storage system to store, retrieve, or otherwise manipulate the data such as a physical address, a logical address, a current location, data attributes, etc.), and/or any other relevant information. The storage system 102 executes the data transactions on behalf of the hosts 104 by writing, reading, or otherwise accessing data on the relevant storage devices 106. A storage system 102 may also execute data transactions based on applications running on the storage system 102 using the storage devices 106. For some data transactions, the storage system 102 formulates a response that may include requested data, status indicators, error messages, and/or other suitable data and provides the response to the provider of the transaction.

According to embodiments of the present disclosure, when a write I/O is sent from a host 104 to the storage system 102, a storage controller 108 (either 108.a or 108.b) may write the data to the destination on one or more storage devices 106 and arbitrary sized blocks, such as shown in FIG. 2.

Data transactions are often categorized as either block-level or file-level. Block-level protocols designate data locations using an address within the aggregate of storage devices 106. Suitable addresses include physical addresses, which specify an exact location on a storage device, and virtual addresses, which remap the physical addresses so that a program can access an address space without concern for how it is distributed among underlying storage devices 106 of the aggregate. Exemplary block-level protocols include iSCSI, Fibre Channel, and Fibre Channel over Ethernet (FCoE). iSCSI is particularly well suited for embodiments where data transactions are received over a network that includes the Internet, a WAN, and/or a LAN. Fibre Channel and FCoE are well suited for embodiments where hosts 104 are coupled to the storage system 102 via a direct connection or via Fibre Channel switches. A Storage Attached Network (SAN) device is a type of storage system 102 that responds to block-level transactions.

In contrast to block-level protocols, file-level protocols specify data locations by a file name. A file name is an identifier within a file system that can be used to uniquely identify corresponding block addresses. File-level protocols rely on the storage system 102 to translate the file name into respective block addresses. Exemplary file-level protocols include SMB/CFIS, SAMBA, and NFS. A Network Attached Storage (NAS) device is a type of storage system that responds to file-level transactions. As another example, embodiments of the present disclosure may utilize object-based storage, where objects are instantiated that are used to manage data instead of as blocks or in file hierarchies. In such systems, objects are written to the storage system similar to a file system in that when an object is written, the object is an accessible entity. Such systems expose an interface that enables other systems to read and write named objects, that may vary in size, and handle low-level block allocation internally (e.g., by the storage controllers 108.a, 108.b). It is understood that the scope of present disclosure is not limited to either block-level or file-level protocols or object-based protocols, and in many embodiments, the storage system 102 is responsive to a number of different memory transaction protocols.

Figure 3:
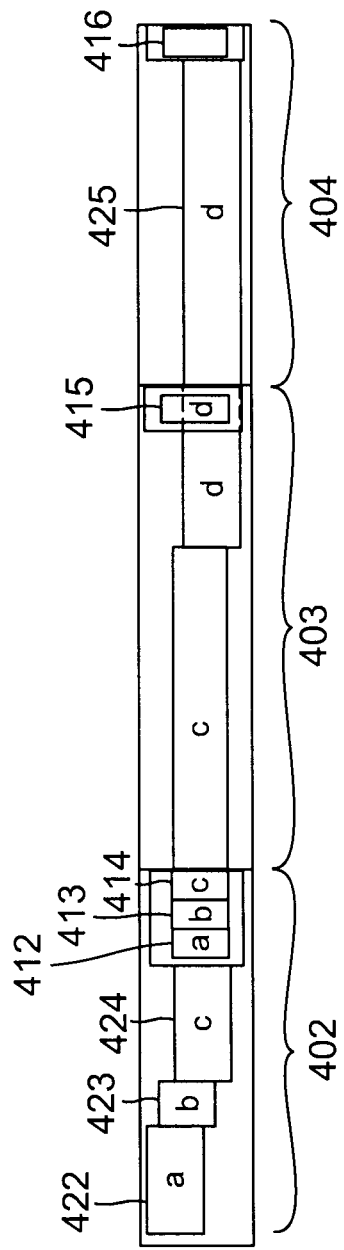
FIG. 3 is an illustration of multiple physical storage blocks including multiple data extents and in-line data descriptors according to aspects of the present disclosure.

FIG. 3 is an illustration of three physical storage blocks 402-404 of a storage drive storing user data and in-line descriptors, according to one embodiment. The data extents are shown as items 422-425. As shown in this figure, and data extents 422-424 all begin within the same storage block 402, and therefore have a same block address. Data extent 424 starts at storage block 402 and spans through storage block 403. Data extent 425 begins in storage block 403 and spans through storage block 404.

Various embodiments provide the ability to store multiple data extents in the same storage block, as illustrated by data extents 422-424 stored to storage block 402. Also, various embodiments provide the ability to store data extents that span multiple blocks, and while the embodiments of FIG. 3 shows two data extents 424, 425, which each span more than one storage block, the scope of embodiments allows for any size of data extent that may span more than two storage blocks.

Storage block 402 includes an in-line descriptor, and when read from left to right, the in-line descriptor is configured as a footer (rather than a header). However, the scope of embodiments includes configuring in-line descriptors as either headers or footers as appropriate. Since data extents 422-424 each start within storage block 402, storage block 402 includes in-line descriptors 412-414 to describe data extents 422-424. Data extent 425 begins at storage block 403, and thus storage block 403 includes in-line descriptor 415 to describe storage block 425. No data extent begins within storage block 404, although data extent 425 spans a portion of storage block 404. Accordingly, storage block 404 does not include a descriptor for a given data extent, although it does include a footer having information 416 (e.g., a storage block checksum, an indication that no data extent starts in this block, and/or the like). The particular contents of the in-line descriptors 412-416 is described in more detail below with respect to FIGS. 4-5.

Data extents 422-424 have a same block address because they begin in the same storage block 402. Data extent 422 has an initial offset of zero. The first byte of data extent 423 begins at a location that is equal to a length of data extent 422 plus any initial offset of data extent 422. Similarly, data extent 424 has its first data byte located at a position that is equal to the length of data extents 422 and 423 plus any initial offset of data extent 422. In other words, the location of a data extent's first data byte is computed by summing the lengths of any other preceding data extents starting in the same block plus the initial offset of the first data extent in the block. Processes in the storage controller use the block address to identify a storage block and then read the block as a whole in a single read operation, including user data and in-line descriptors. After having read the contents of the block, the processes may then parse the in-line descriptors to find the location of the first byte of the particular data extent.

Taking as an example a read request to read data extent 423: a storage controller receives an 110 request identifying a particular LBA, and the storage controller uses a tree metadata structure at metadata store 116 to identify a block address, where a block address identifies a particular storage block of a storage drive. The metadata structure also provides a number of storage blocks to be read for the particular data extent (e.g., the data extent may span multiple storage blocks) and an extent identifier. Assuming that storage block 402 is identified, the storage controller reads storage block 402, including its in-line descriptors 412-414. The storage controller computes the location of the beginning of data extent 423 by summing the initial offset for extent 422 (if any) and the length of extent 422. Read requests for the other data extents 422, 424, 425 operate in a similar manner. It is to be noted that data extent 425 has a nonzero initial offset at block 403.

It is also noted that many cost efficient SATA storage drives do not allow for an extra eight bytes of T10 protection information because the storage blocks are exactly either 512 bytes or 4 kB without an extra eight bytes allotted. The data extents 422-425 would not be block aligned in such drives, even without the addition of the in-line descriptors 412-416. However, various embodiments allow for arbitrarily sized data extents because the data extents can be found using their extent IDs and offsets. Accordingly, various embodiments allow for the insertion of T10 protection data and or other protection information without any loss of efficiency because storage block alignment is not required of the data extents.

Figure 4:
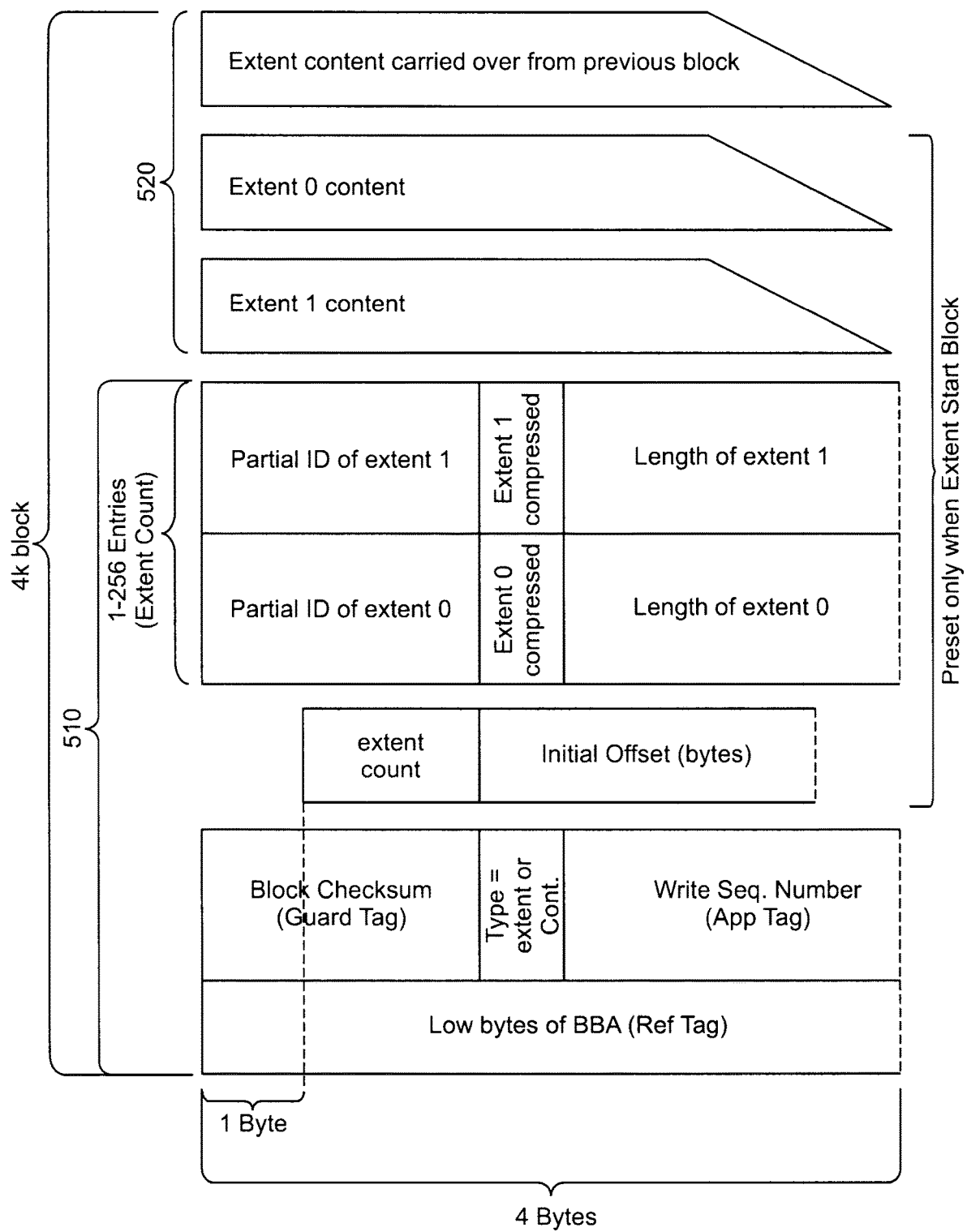
FIGS. 4-8 are examples of storage block content formats, for both user data and metadata, according to aspects of the present disclosure.

FIG. 4 is an illustration of contents of an example storage block according to one embodiment. The contents include an example header 510 according to one embodiment. For instance, header 510 could be used in the embodiment of FIG. 3 to implement in-line descriptors 412-414. In this example the contents of the storage block are read left to right and top to bottom, and header 510 placed at the beginning of the storage block. User data 520 includes the data extents themselves. While the example of FIG. 4, and the other examples of FIGS. 5-8 refer to specific sizes in bytes and to specific types of information within an in-line descriptor, it is understood that the scope of embodiments includes use of any appropriate number of bytes and any appropriate field for desired information.

Various embodiments use a format that follows the industry standard T10 Protection Information (PI), which specifies a Guard Tag, App Tag, and Ref Tag. In this example the Guard tag includes the 4K block checksum or CRC to protect against bit flips and other corruptions. The App Tag includes the low order bits of a Write Sequence Number which allows dropped writes to be detected. A Write Sequence Number refers to a number associated with a segment, where a segment refers to an integer number of stripes. For instance, FIG. 2 shows a stripe, where multiple ones of those stripes would make up a segment. A given segment is usually written very quickly and is then read only until it is garbage collected. Each segment is written sequentially from beginning to end and is given a Write Sequence Number. Each of the data extents in a given segment should have a same Write Sequence Number. if a data extent is associated with a different Write Sequence Number than its neighboring data extents, that is an indication that a write operation was dropped. Accordingly, some embodiments identify dropped writes by inspecting the Write Sequence Number field.

The Ref Tag is the low order bytes of the block address and is used to ensure that a nearby block with a consistent Guard Tag and correct App Tag would not be mistakenly accepted if jumbled into the data stream. Any detected errors can be resolved using the RAID redundancy of the storage system.

The Block Type (or simply Type) field is carved out of the App Tag. If unknown when a read is being performed (i.e. recovery) or if multiple Types are expected in a transfer, the Type field portion can be ignored by the I/O Controller during verification of the App Tag by specifying a mask. The Type field identifies what kind of data is contained in the storage block and is a key to determine if additional type-specific fields exist and the format of the block. Examples of values for the Type field include Start Block, Continuation Block, Table of Contents Block (FIG. 6), TOC Information Card Block (FIG. 6), metadata objects (FIG. 7), metadata TOCs (FIG. 8), and the like (all of which are explained in more detail below).

There are two forms of storage blocks in the example of FIG. 3. A Start Block contains the beginning of at least one data extent and may contain the tail of a data extent that begins in a previous block. Storage blocks 402 and 403 of FIG. 3 are examples of Start Blocks. A Continuation Block is a storage block that does not contain the head of a new object and contains the continuation of a data extent whose head is in a previous storage block, an example of which is storage block 404 of FIG. 3. The Type field then is used to determine whether additional metadata is present to describe each data extent starting in this block. A block may house multiple data extents in their entirety. The last data extent in a block may spill into the next or many more blocks. A block may also, therefore, only contain part of a data extent.

The Initial Offset field determines the boundary between a data extent continued from the prior storage block and the first data extent starting in this block. In one example, the Initial Offset field is included in in-line descriptor 415 to indicate an initial offset for data extent 425.

Extent Count field determines the size of the Inline Block Descriptor as well as how many data extents start in this block. It allows for multiple extents to be stored in one block. In this example the count allows for 256 data extents, though the scope of embodiments is not limited to any maximum number of data extents. Per-extent there is a unique identifier (extent ID) and a length indication. The extent ID does not have to be the full identifier, but should be enough of the identifier to properly identify the extent within the block. When packing the extents for writing into the block, the system can check that there are no collisions with the partial extent ID, and in the rare case there is simply place the extent in the next block. The length field allows for arbitrary sized extents, such as might be expected with compression. In other words, various embodiments may provide for arbitrarily sized data extents, so that data packing may be performed at a byte-level granularity.

The Compressed field indicates whether the data extent is compressed (a non-zero value) and what compression type was used. The example of FIG. 4 shows a footer, but in an example including a header the inline block descriptor is aligned with the beginning of the block, while the user data is filled in after the descriptor. Some pad bytes between the two is possible.

Figure 5:
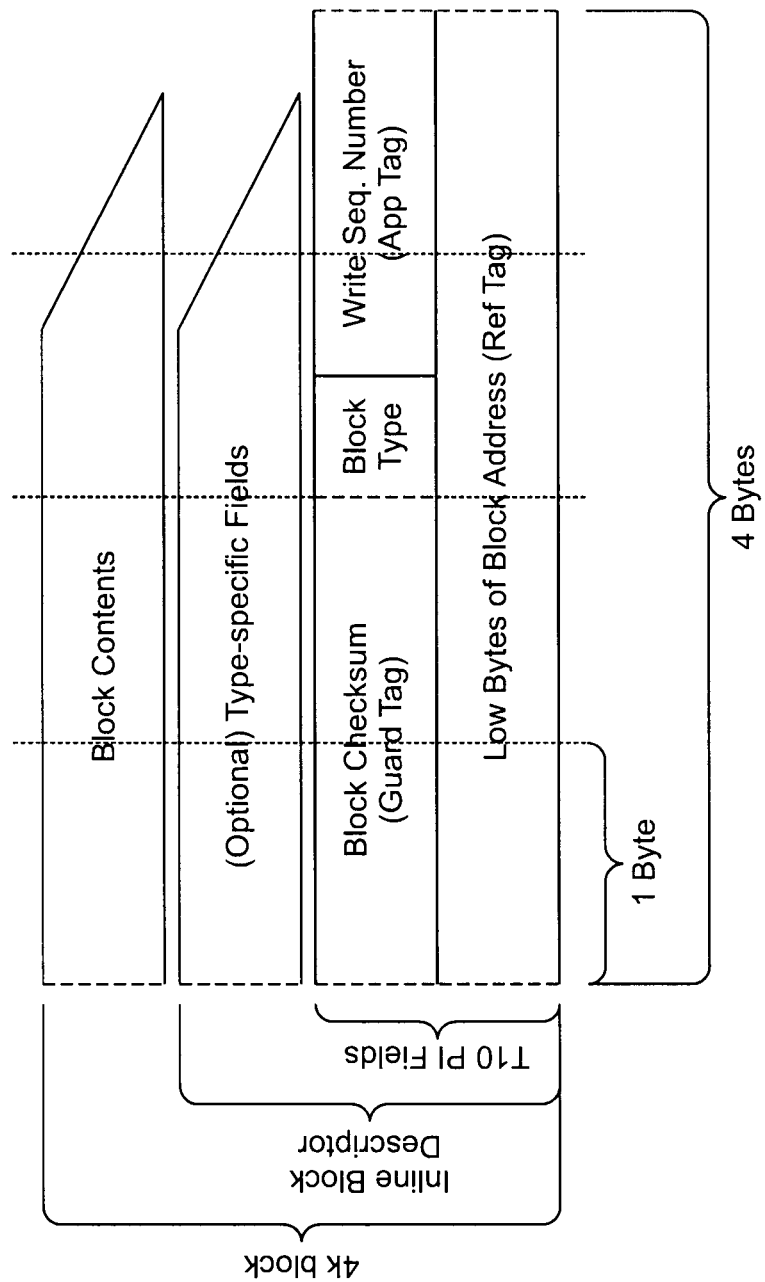

FIG. 5 is an illustration of an example general format that can be used to place in-line descriptors, such as footers, in storage blocks. The format shown in FIG. 5 may be applied to data extents storing user data as well as data extents that store metadata in metadata store 116 of FIG. 1. In the case of a footer, the block contents are placed first within the storage block, as shown in FIG. 5. In the case of a header, the block contents would be placed last within the storage block. The general format shown in FIG. 5 includes the Guard Tag, App Tag, and Ref Tag, as specified by the T10 protection information standard, and described in more detail above. One advantage of the general layout shown in FIG. 5 is that it includes the T10 protection information within the storage blocks, which may lead to efficient operation in some systems. Specifically, a storage controller, such as one of the storage controllers 108 of FIG. 1, may include a main CPU as well as a processor included in an input output controller. The main CPU executes computer readable code to perform most of the actions described herein. However, some embodiments may include providing the T10 protection information to the processor of the input output controller and offloading data verification to the input output controller. Such embodiments may decrease the load on the main CPU, thereby increasing efficiency of the storage controller overall.

Returning to the example of FIG. 2, each stripe piece includes tables of contents at the end of the stripe piece. For instance, the stripe piece on drive 1 includes table of contents (TOC) 222. The other TOCs are shown as items 224 and 226. The last data extent within a stripe piece, and labeled "0" in FIG. 2 is a table of contents information card (TIC). As described further below, the TOCs may be formatted according to the example of FIG. 6.

Each TOC 222-226 contains a record of each data extent, a length of each data extent, and also some information about the stripe to facilitate recovery in the case of metadata loss. The storage controller 108 uses the TOCs 222-226 to aid in the sequential bulk processing of a segment, such as metadata recovery and garbage collection. Since data extent sizes are variable within the stripe, it follows that the number of data extents within a segment, and therefore the size of the TOC is variable. The block referred to as the TIC contains the length of the TOC, additionally, it contains information useful for recovery when metadata is lost. The remainder of the TIC block contains the first entries in the TOC. In this example, it is located at a fixed position which is the last block of the stripe piece or of the stripe, and storage controller 108 writes the TIC after the other content within the stripe piece or stripe. The remaining TOC blocks precede the TIC on the storage drive, which means that the TOC length field doubles as a back pointer. Each TIC and TOC has a field called Entry Type to differentiate between TOC entries that are used with respect to user data and those that are used with respect to metadata. The Entry Type field is four bits wide in this example.

Figure 6:
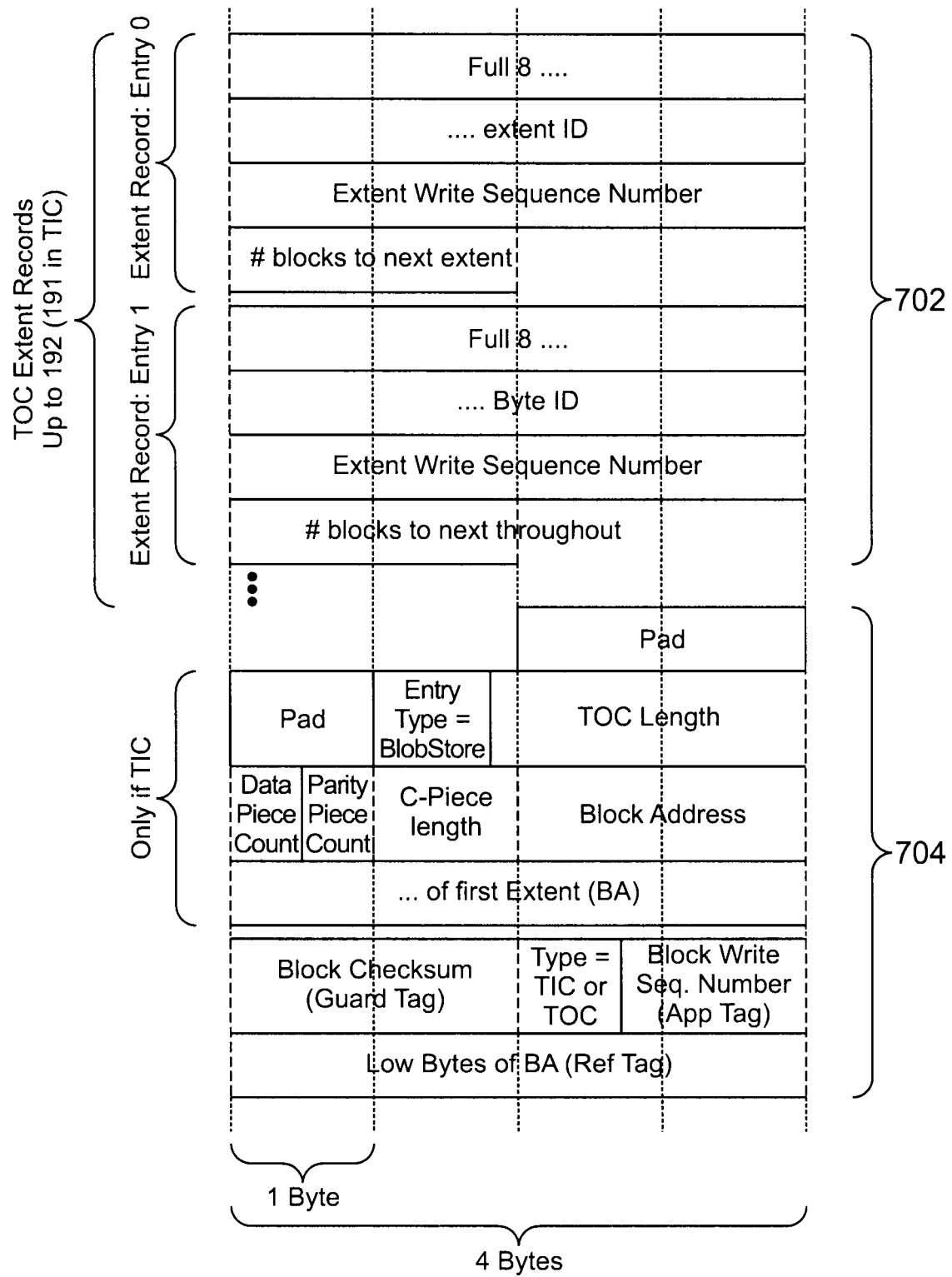

FIG. 6 is an illustration of an example TOC or TIC storage block format, according to one embodiment. In the case of a TOC, the storage block contents start off with "extent records" 702, each of which describes a particular data extent and includes a full 8 byte extent ID and a 4 byte Write Sequence Number. A TOC may include as many extent records as there are data extents in a stripe piece or a stripe. The storage block format also includes a footer 704. The portion in FIG. 6 titled "only if TIC" includes fields that are used for TIC blocks. The block address of the first extent is added with the cumulative lengths of the prior extents to determine the full block address of an extent during segment processing. The starting address of the first extent is the starting address of the stripe piece which can be used to distinguish the pieces sharing a same App Tag to determine which pieces belong together in the same stripe. The Ref Tag can be used by the storage controller to order the stripe pieces. The Ref Tag in conjunction with the stripe address can determine the address of the current storage block. The fields Data. Piece Count and Parity Piece Count are stripe width fields, and the storage controller 108 uses them to determine what RAID level is being used even if there are missing storage drives.

The tree data structures and global index, discussed above with respect to FIGS. 1 and 2, are stored in the metadata store 116. As noted above, the metadata store 116 may be implemented using any appropriate storage drive device, and in this example includes one or more SSDs. Further in this example, the storage system stores the metadata of the tree data structures and the global index as objects that are treated similarly to the user data that is stored in the data extents of FIGS. 3 and 4. Or put another way, the metadata of the tree data structures and global index is stored according to the general format shown in FIG. 7.

Figure 7:
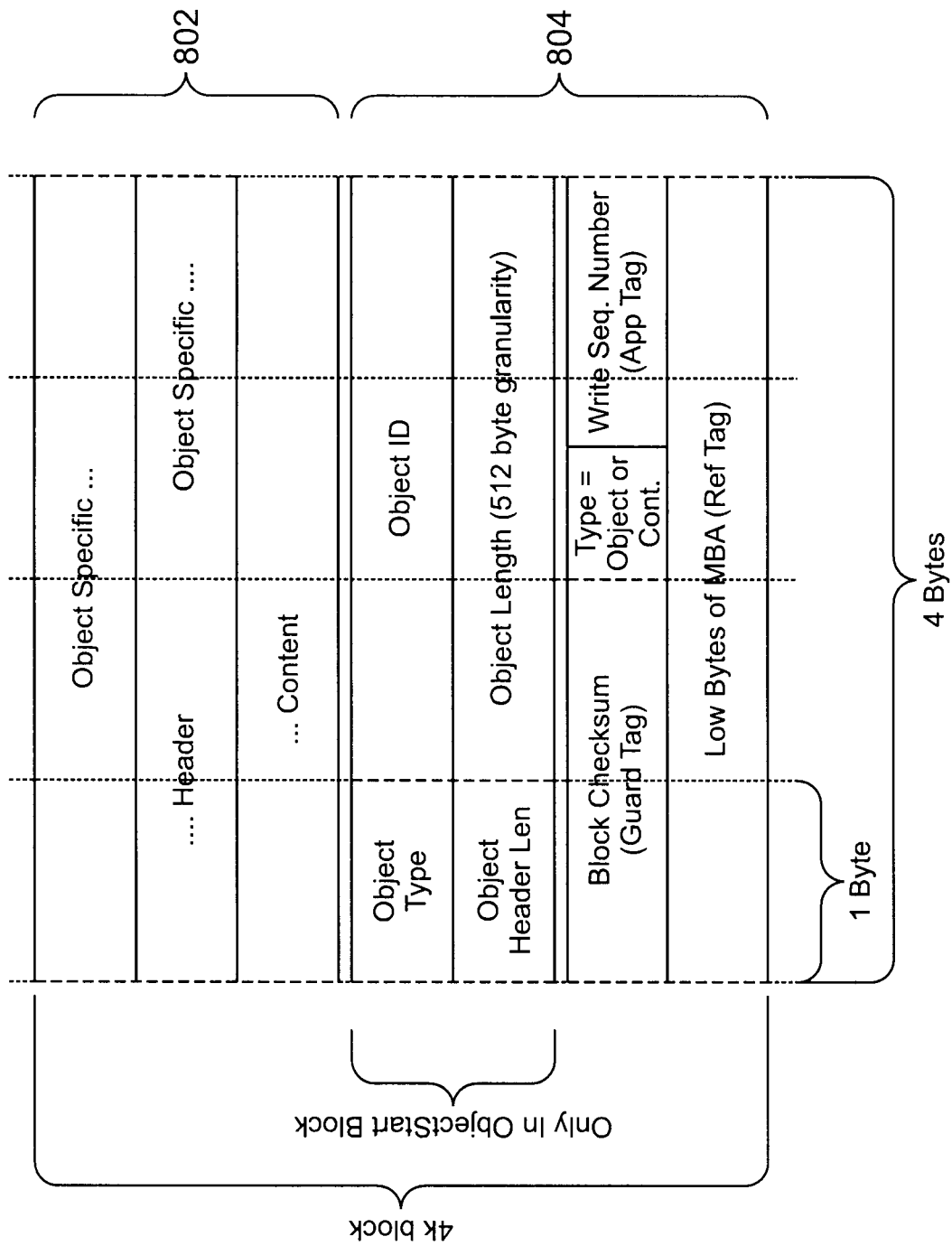

FIG. 7 is an illustration of an example object block, which is similar to a storage block in FIG. 3, and it is used to store metadata. Each of the metadata entries is referred to as an object in this example. The metadata of the object is stored as shown at item 802. The object block also includes a footer 804, which describes the contents of the object block. In this example, objects start at the beginning of a block, and they may span multiple blocks. The field Object Type is used by the storage controller 108 to determine which metadata client owns the data, and the field provides that client information which can be used to determine if the object is still valid. The storage controller 108 may determine if an object is still valid for garbage collection (e.g., by moving valid data). The field Object Header Length determines the length of the header and therefore affects the size of the entry. The field Object Type refers to either an object start block, which is a storage block in which an object starts, or a continuation block, which is a storage block that has part of an object that continues from a previous storage block but no new object starts within the continuation block. The Guard Tag, App Tag, and Ref Tag are the same as described above with respect to the user data.

Figure 8:
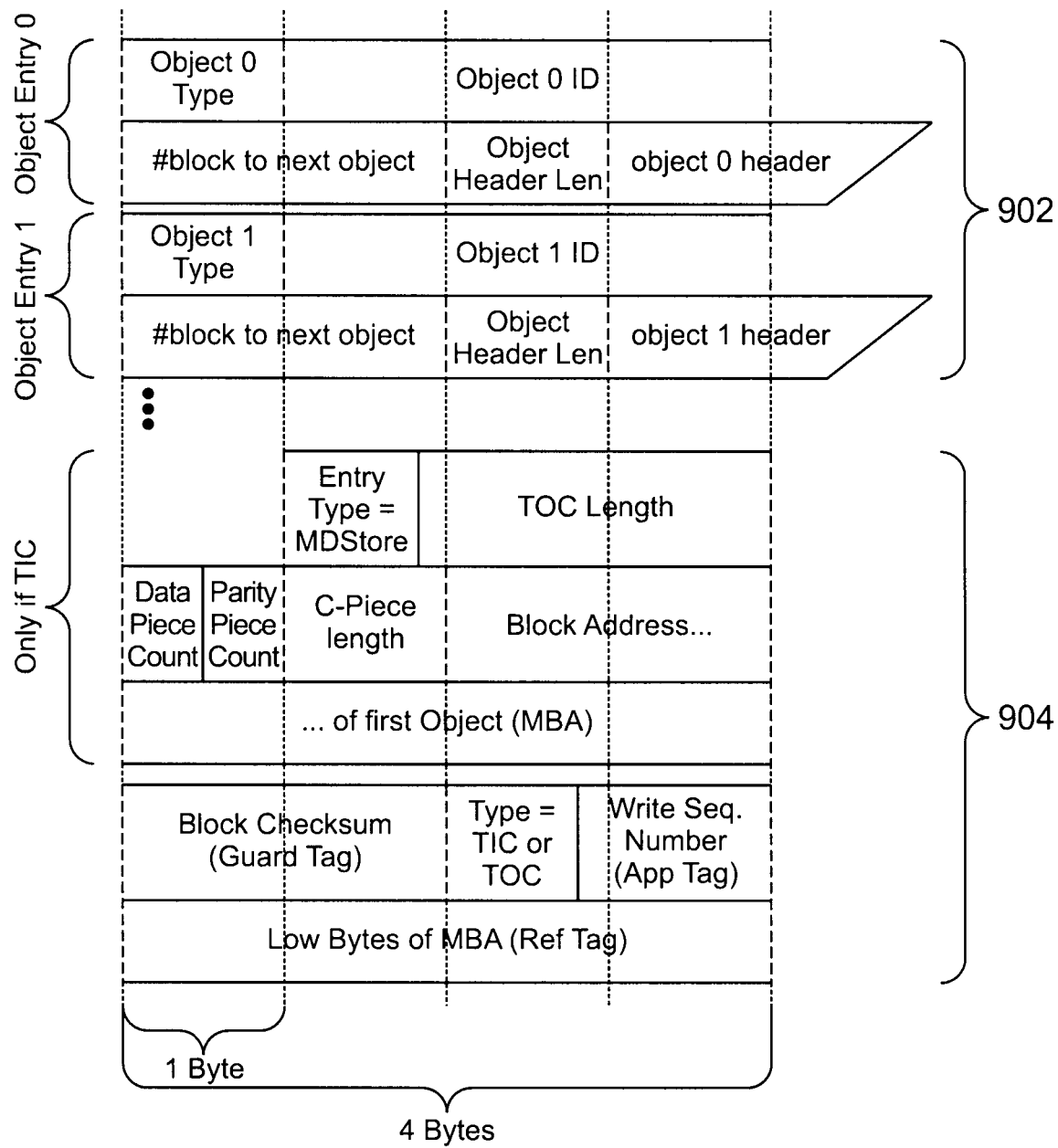

The metadata objects may be stored according to the format of FIG. 2, including using TOCs and TICs as appropriate. FIG. 8 is an illustration of an example TIC or TOC storage block format for use with metadata in the metadata store 116, according to one embodiment. The format shown in FIG. 8 is analogous to the format shown in FIG. 7. Specifically, each object has its own entry in the TOC, which is shown as items 902. The format also includes footer 904, where the fields are the same as those described above.

Figure 9:
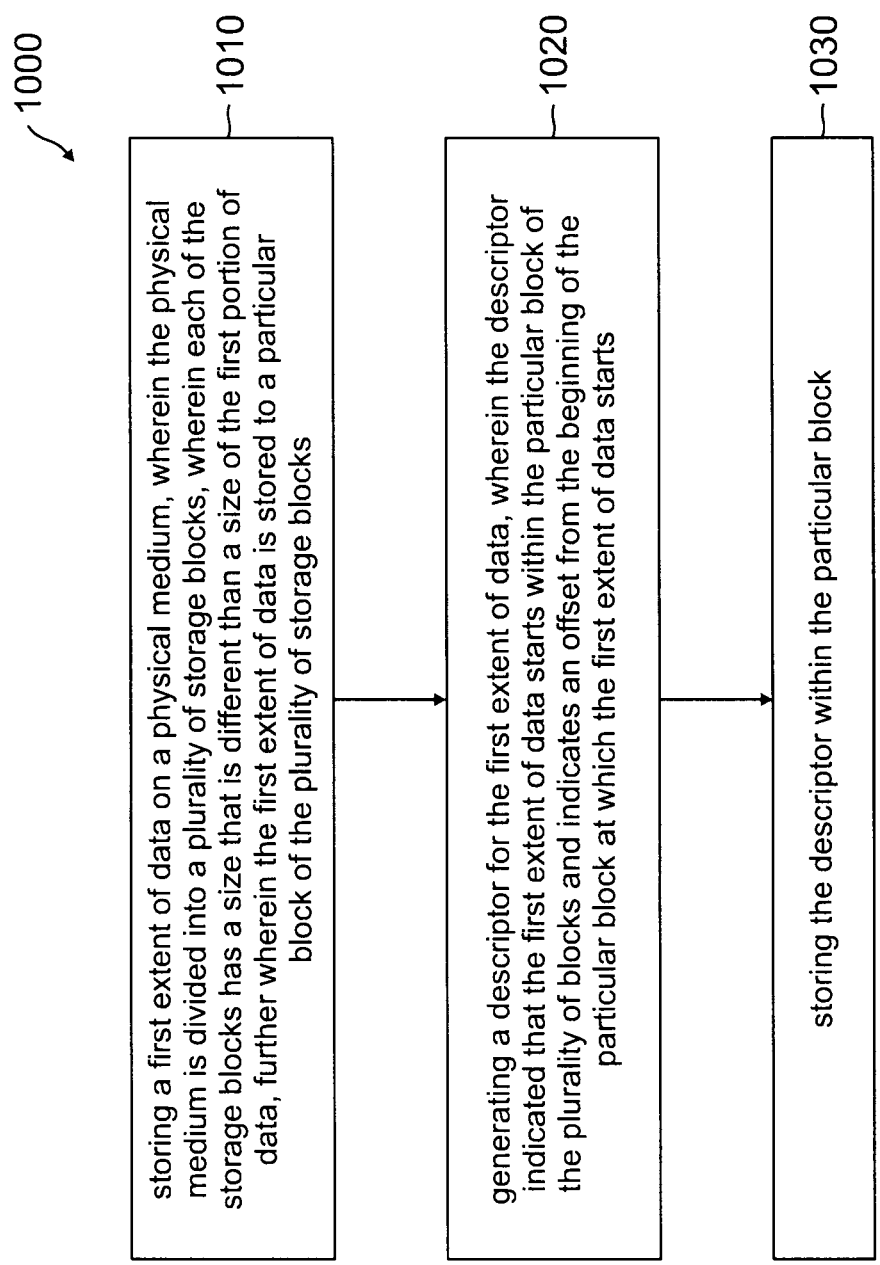
FIG. 9 is a flow diagram of a method for writing data according to arbitrarily sized data extents according to aspects of the present disclosure.

Turning now to FIG. 9, a flow diagram is illustrated of a method 1000 for storing data in arbitrarily sized data extents according to aspects of the present disclosure. In an embodiment, the method 1000 may be implemented by one or more processors of one or more of the storage controllers 108 of the storage system 102, executing computer-readable instructions to perform the functions described herein. In the description of FIG. 9, reference is made to a storage controller 108 (108.*a* or 108.*b*) for simplicity of illustration, and it is understood that other storage controller(s) may be configured to perform the same functions when performing a pertinent requested operation. It is understood that additional steps can be provided before, during, and after the steps of method 1000, and that some of the steps described can be replaced or eliminated for other embodiments of the method 1000.

At action 1010, the storage controller stores a first data extent on a physical medium. An example includes an HDD or other suitable storage drive. Further in this example, the physical medium is divided into a plurality of storage blocks, such as 512 byte storage blocks or 4 kB storage blocks, and each of the storage blocks has a size that may be different from a size of the data extent. In fact, the block size and extent size may have no relation to each other at all—for instance one may not be a multiple of the other. The data extent is stored to a particular block of the plurality of storage blocks and may extend into other storage blocks.

Action 1020 includes generating a descriptor of the first data extent. The descriptor indicates that the first data extent starts within the particular storage block and indicates an offset from the beginning of the particular storage block at which the first data extent starts.

The descriptor is stored in line with the storage block. An example of the descriptor and action 1020 includes the descriptors 412-416 of FIG. 3, which may be configured as headers or footers according to the examples of FIGS. 4 and 5. Further in this example, the descriptor may include any appropriate information to describe the contents of the storage block. The example of FIG. 4 includes a checksum for the storage block, a field to indicate a type of the data extent, a field to indicate a number of data extents starting within the storage block, a Write Sequence Number of a segment associated with the data extent, and ID of the data extent, a length of the data extent, and the like.

Furthermore, the example of FIG. 5 includes the tags associated with standard T10 protection information, including a Guard Tag, a App Tag, and a Ref Tag. The inclusion of protection information within in-line descriptors may be advantageous, as described further below in more detail.

Action 1030 includes storing the descriptor within the particular block. However, it should be noted that the scope of embodiments is not limited to any particular sequence of events for storing either the in-line descriptor or the data within a storage block. Various embodiments store the data and the in-line descriptor in the block in a single write operation. When the data and descriptor are later read, they are read in a single read operation. Furthermore, various embodiments include storing metadata, such as tree data structures and data structures translating a logical address to a physical address using the same or similar formats, as described above with respect to FIGS. 7 and 8.

The scope of embodiments is not limited to method of FIG. 9, as other embodiments may add, omit, rearrange, or modify one or more of the actions. For instance, various embodiments further include verifying portions of data using the checksums in the in-line descriptors. For instance, some storage systems include a garbage collection function, which moves valid data from old segments into new segments, while allowing the blocks of an old segment to be reused. In other words, garbage collection may include an internal copying of data extents from a subset of storage blocks to another subset of storage blocks. However, garbage collection may be computationally intensive and may use resources of a CPU of the storage controller. One example includes using a processor of an input output controller of a storage controller, rather than a main CPU of the storage controller, to verify the data. As the storage controller reads the data from the storage blocks, it instructs the input output controller to verify the data extents. The input output controller looks at the checksums from the in-line descriptors of the data blocks. If the checksums indicate an error, the appropriate action can be taken, such as marking some data as invalid or repairing the data if possible.

Furthermore, various embodiments may provide for an enhancement of data verification using the Write Sequence Number. Conventional T10 protection information provides a checksum to indicate whether data is valid, but it does not necessarily indicate whether data is stale. Various embodiments herein include a Write Sequence Number with an in-line descriptor. Since Write Sequence Numbers apply to segments, and since segments include a very large number of data extents, then it is expected that a given data extent should have a same Write Sequence Number as its neighbors and as the other data extents within the segment. Various embodiments include the storage controller checking a Write Sequence Number of a data extent as it reads the data extents and determining whether data is valid or invalid by checking whether a data extent has a Write Sequence Number that matches an expected value. When a value of a Write Sequence Number is incorrect, that may indicate invalid data that may be caused by a missed write. The storage controller can then take appropriate action, such as marking the data as invalid or repairing the data. Furthermore, this process allows checking a Write Sequence Number without having to do an extra read, since the Write Sequence Number is written in-line within the storage block.

As a result of the elements discussed above, embodiments of the present disclosure improve upon storage system technology. For example, embodiments of the present disclosure support the general goals of efficient and reliable storage. More specifically, it allows for byte granular packing of data in blocks. By doing this it allows for metadata to be interspersed with the payload of each block, even if that payload is another type of metadata. Such embodiments may enable the use of compression which leads to data lengths that do not fall on physical storage block boundaries and would otherwise result in inefficient use of space in block granular packing. The formatting contents of the on-drive layout also supports efficient data integrity verification. Furthermore, some embodiments provide for the capability to save data extents entirely on a contiguous sequence of blocks on a single physical medium. In other words, some embodiments are not forced to split up a large data extent by saving it so that it spans from one physical medium to the next physical medium in a stripe. Such advantage may be valuable in recovery scenarios.

In some embodiments, the computing system is programmable and is programmed to execute processes including the processes of method 1000 discussed herein. Accordingly, it is understood that any operation of the computing system according to the aspects of the present disclosure may be implemented by the computing system using corresponding instructions stored on or in a non-transitory computer readable medium accessible by the processing system. For the purposes of this description, a tangible computer-usable or computer-readable medium can be any apparatus that can store the program for use by or in connection with the instruction execution system, apparatus, or device. The medium may include for example non-volatile memory including magnetic storage, solid-state storage, optical storage, cache memory, and Random Access Memory (RAM).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
indicating using a descriptor for a first data extent, wherein the descriptor indicates that storage of contents of the first data extent starts within a first physical block of a plurality of storage blocks of a physical medium and indicates an offset from a beginning of the first physical block at which storage of the contents of the first data extent starts;
storing the descriptor and a first part of the contents of the first data extent within the first physical block and a second part of the contents of the first data extent within a second physical block, the second physical block being physically adjacent to the first physical block on the physical medium;
receiving a read request corresponding to the first data extent;
reading the first physical block from the physical medium, the reading including reading, using a same read operation, the first part of the contents of the first data extent and the descriptor;
parsing the descriptor to determine the offset; and
accessing the first part of the contents of the first data extent from data read from the first physical block using the offset.

2. The method of claim 1, wherein the descriptor is stored at the beginning of the first physical block or is stored at an end of the first physical block.

3. The method of claim 1, wherein the descriptor further includes a Write Sequence Number associated with a sequentially-written segment that includes a stripe.

4. The method of claim 1, wherein the descriptor further includes a field indicating a total non-zero number of data extents whose contents are stored starting within the first physical block, and further wherein the first physical block stores at least contents of an additional partial data extent included within the total non-zero number.

5. The method of claim 1, wherein contents of an additional partial data extent is at least partially stored within a third block of the plurality of storage blocks.

6. The method of claim 1, wherein the descriptor further includes an identifier of the first data extent and an indication of a length of the first data extent.

7. The method of claim 1, wherein the descriptor includes:
a guard tag having a checksum of the first physical block.

8. The method of claim 1, wherein a storage system including the physical medium further includes an additional physical medium different from the physical medium, the additional physical medium storing metadata describing the first data extent.

9. The method of claim 1, further comprising:
generating a checksum on the contents of the first data extent and including the checksum within the descriptor.

10. A non-transitory machine-readable medium having stored thereon instructions for performing a method comprising machine executable code which when executed by at least one machine, causes the machine to:
indicate using a descriptor for a first data extent, wherein the descriptor indicates that storage of contents of the first data extent starts within a first physical block of a plurality of storage blocks of a physical medium and indicates an offset from a beginning of the first physical block at which storage of the contents of the first data extent starts;
store the descriptor and a first part of the contents of the first data extent within the first physical block and a second part of the contents of the first data extent within a second physical block, the second physical block being physically adjacent to the first physical block on the physical medium;
receive a read request corresponding to the first data extent;
read the first physical block from the physical medium, the reading including reading, using a same read operation, the first part of the contents of the first data extent and the descriptor;
parse the descriptor to determine the offset; and
access the first part of the contents of the first data extent from data read from the first physical block using the offset.

11. The non-transitory machine-readable medium of claim 10, wherein the descriptor is stored at the beginning of the first physical block.

12. The non-transitory machine-readable medium of claim 10, wherein the descriptor is stored at an end of the first physical block.

13. The non-transitory machine-readable medium of claim 10, wherein the first data extent is one of a plurality of data extents whose contents are stored in a stripe that spans across a plurality of physical media including the physical medium.

14. The non-transitory machine-readable medium of claim 10, wherein the descriptor includes:
a guard tag having a checksum of the first physical block.

15. A computing device comprising:
a memory containing machine readable medium comprising machine executable code;
a processor coupled to the memory, the processor configured to execute the machine executable code to cause the processor to:
indicate using a descriptor for a first data extent, wherein the descriptor indicates that storage of contents of the first data extent starts within a first physical block of a plurality of storage blocks of a physical medium and indicates an offset from a beginning of the first physical block at which storage of the contents of the first data extent starts;
store the descriptor and the first part of the contents of the first data extent within the first physical block and a second part of the contents of the first data extent within a second physical block, the second physical block being physically adjacent to the first physical block on the physical medium;
receive a read request corresponding to the first data extent;
read the first physical block from the physical medium, the reading including reading, using a same read operation, the first part of the contents of the first data extent and the descriptor;
parse the descriptor to determine the offset; and
access the first part of the contents of the first data extent from data read from the first physical block using the offset.

16. The computing device of claim 15, wherein the descriptor is stored at the beginning of the first physical block.

17. The computing device of claim 15, wherein the descriptor further includes a checksum value of the first physical block.

18. The computing device of claim 15, wherein the descriptor includes:
a guard tag having a checksum of the first physical block;
a ref tag including a plurality of low order bytes of an address of the first physical block; and
an app tag including bits of a sequence number of a sequentially-written segment that includes a data stripe on which the contents the first data extent are stored.

19. The computing device of claim 15, wherein the first data extent comprises user data.

20. The method of claim 1, wherein:
the second block does not include a second descriptor that indicates that storage of contents of the first data extent starts within the second block.

* * * * *